US00RE50059E

(19) United States
(12) Reissued Patent
Zhang et al.

(10) Patent Number: US RE50,059 E
(45) Date of Reissued Patent: Jul. 30, 2024

(54) GAS STOVE TABLE

(71) Applicant: Shenzhen Fanttik Technology Innovation Co., Ltd., Shenzhen (CN)

(72) Inventors: Weijun Zhang, Shenzhen (CN); Haizhuan Lu, Shenzhen (CN)

(73) Assignee: SHENZHEN FANTTIK TECHNOLOGY INNOVATION CO., LTD., Shenzhen (CN)

(21) Appl. No.: 29/793,300

(22) Filed: Mar. 24, 2023

Related U.S. Patent Documents

Reissue of:
(64) Patent No.: Des. 917,681
Issued: Apr. 27, 2021
Appl. No.: 29/720,789
Filed: Jan. 16, 2020

(51) LOC (14) Cl. ..... 23-03

(52) U.S. Cl.
USPC ..... D23/332; D23/339

(58) Field of Classification Search
USPC ..... D23/314, 317, 328, 329, 332, 334, 335, D23/336, 338, 339, 341, 342–350; D7/332, 334–337, 339, 341; D6/685, D6/686, 688.12, 689, 691, 691.1
CPC .... F24C 7/105; F24C 1/10; F24C 3/04; F24C 7/065; F23D 14/12; F24H 3/00; A47J 2037/0777; A47J 37/0763; F24B 3/00; F24B 1/95; F24B 1/00; F24B 13/00; F24B 1/18; F24B 13/004; F24B 1/192; F24B 1/181; F24B 1/182; F24B 1/1802
See application file for complete search history.

(56) References Cited

U.S. PATENT DOCUMENTS 3,491,744 A * 1/1970 Von Kohorn, Jr. ..... A47J 37/0781 D7/334
D233,499 S * 11/1974 Sakata ..... D7/346
D442,808 S * 5/2001 Black ..... D6/708.15
D513,312 S * 12/2005 Borowske ..... D23/342
(Continued)

OTHER PUBLICATIONS

Amazon TACKLIFE Gas Fire Pit Table, 28 inch 50,000 BTU Steel Surface Outdoor Propane Fire Table https://www.amazon.com/dp/B07ZB9NG9R/ref=emc_b_5_i?th=1 (Year: 2020).*

*Primary Examiner* — Darlington Ly

(57) CLAIM

The ornamental design for a gas stove table, as shown and described.

DESCRIPTION

FIG. 1 is a front, right and top perspective view of a gas stove table showing our new design;
FIG. 2 is a rear, left and bottom perspective view thereof;
FIG. 3 is a front elevational view thereof;
FIG. 4 is a rear elevational view thereof;
FIG. 5 is a left side *elevational* view thereof;
FIG. 6 is a right side *elevational* view thereof;
FIG. 7 is a top plan view thereof;
FIG. 8 is a bottom plan view thereof; and,
FIG. 9 is an enlarged *and partial perspective* view of [portion] *area* 9 in FIG. 1.
The broken lines in the drawings illustrate portions of the gas stove table [which] *that* form no part of the claimed design.
*The dash-dot broken lines encircling area 9 in FIGS. 1 and 9 do not represent actual subject matter and are provided for annotative purposes to show the area of enlargement.*

1 Claim, 9 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

| | | | | | |
|---|---|---|---|---|---|
| D580,194 | S | * | 11/2008 | Lambert | D6/689 |
| D580,681 | S | * | 11/2008 | Lambert | D6/689 |
| D613,968 | S | * | 4/2010 | Lambert | D6/689 |
| D618,933 | S | * | 7/2010 | Lambert | D6/689 |
| D698,908 | S | * | 2/2014 | Krieger | D23/314 |
| 10,240,796 | B1 | * | 3/2019 | Stilwell | F24B 1/191 |
| D848,591 | S | * | 5/2019 | O'Brien Wheeler | D23/343 |
| D857,865 | S | * | 8/2019 | Wang | D23/339 |
| D901,651 | S | * | 11/2020 | Wang | D23/339 |
| D912,233 | S | * | 3/2021 | Zhang | D23/339 |
| D917,681 | S | * | 4/2021 | Zhang | D23/339 |
| D919,776 | S | * | 5/2021 | Zhong | D23/339 |
| D955,792 | S | * | 6/2022 | Li | D6/691.1 |
| D981,166 | S | * | 3/2023 | Wang | D7/334 |
| D981,167 | S | * | 3/2023 | Wang | D7/334 |
| D983,578 | S | * | 4/2023 | Chen | D23/339 |
| D987,794 | S | * | 5/2023 | Zemel | D23/338 |
| D995,736 | S | * | 8/2023 | Yan | D23/339 |
| D998,118 | S | * | 9/2023 | Li | D23/339 |
| D998,121 | S | * | 9/2023 | Zemel | D23/338 |
| D999,356 | S | * | 9/2023 | Cho | D23/364 |
| 2017/0261210 | A1 | * | 9/2017 | Harris | F24B 1/181 |
| 2019/0301739 | A1 | * | 10/2019 | Dobias | F24C 5/08 |
| 2020/0191407 | A1 | * | 6/2020 | Zemel | A47B 37/04 |

* cited by examiner

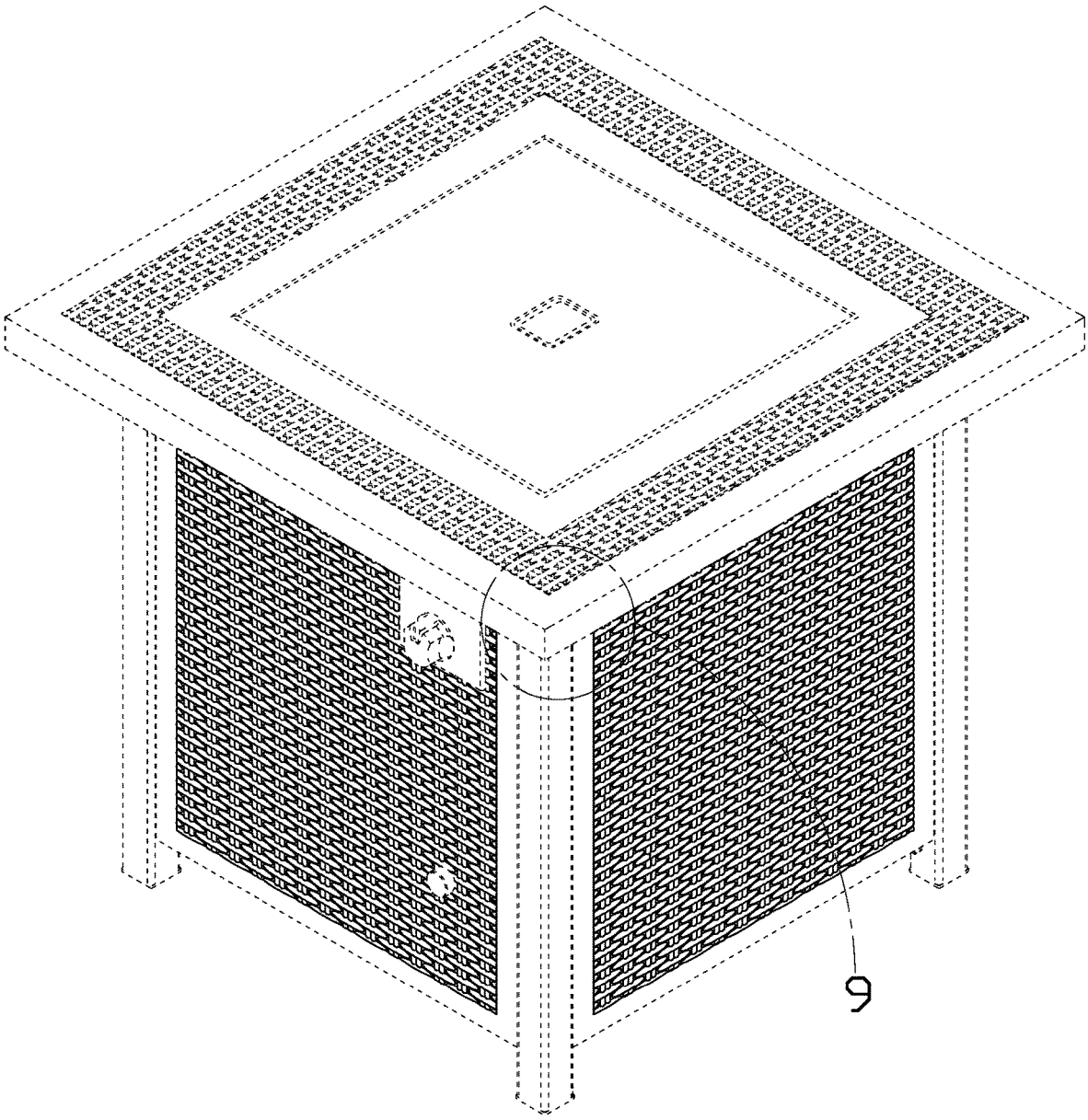
FIG. 1 (Amended)

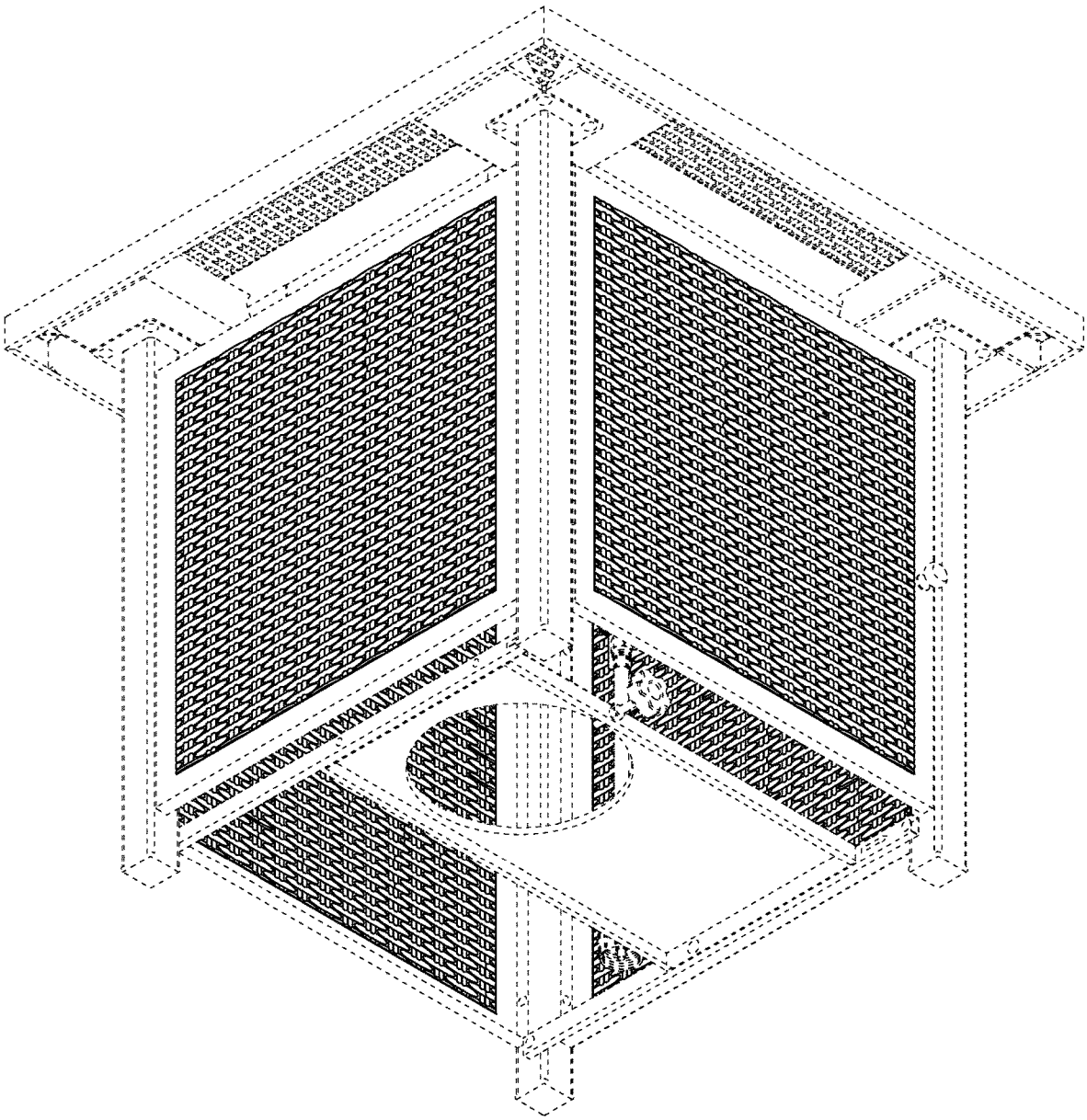
FIG. 2 (Amended)

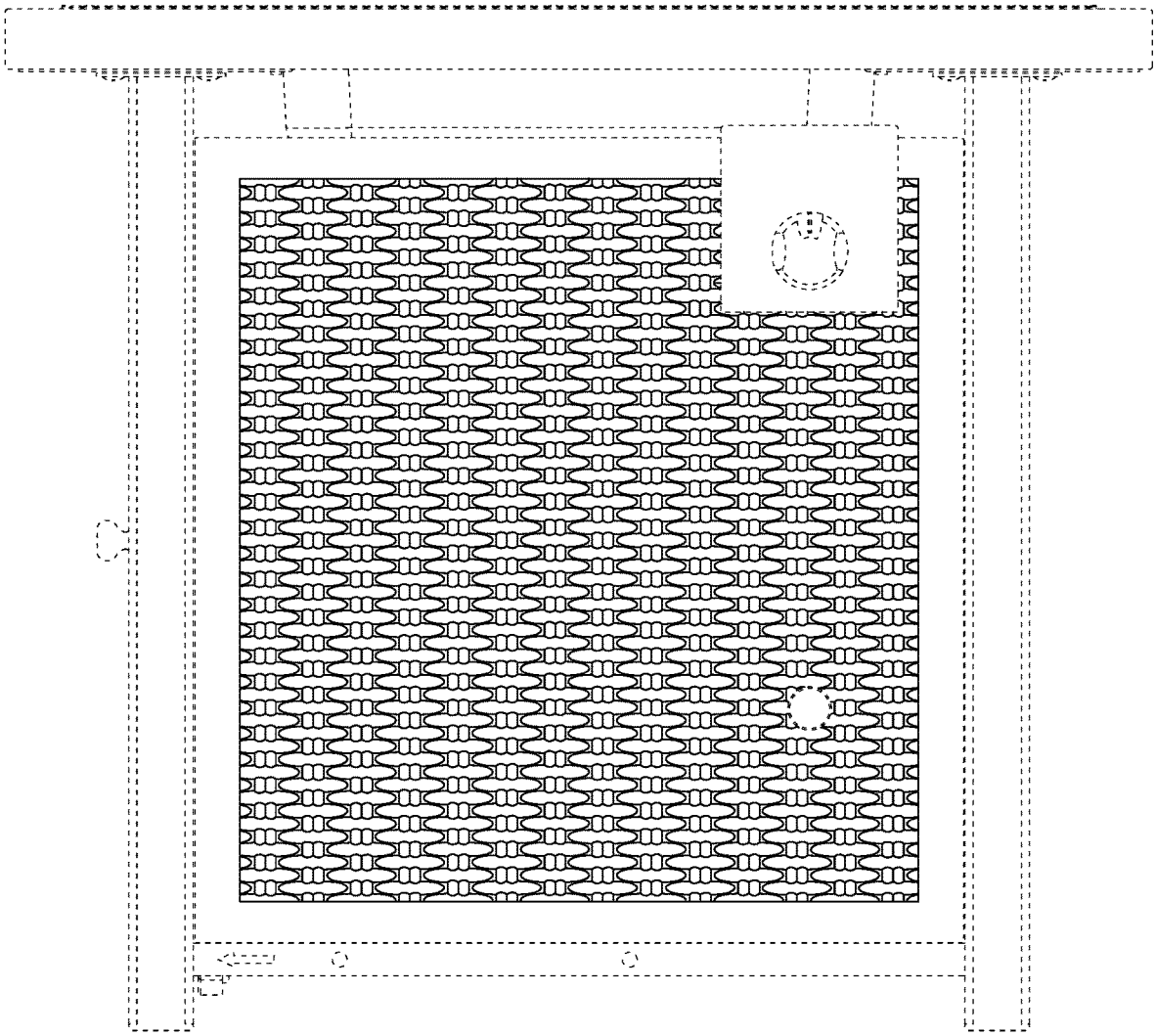
FIG. 3 (Amended)

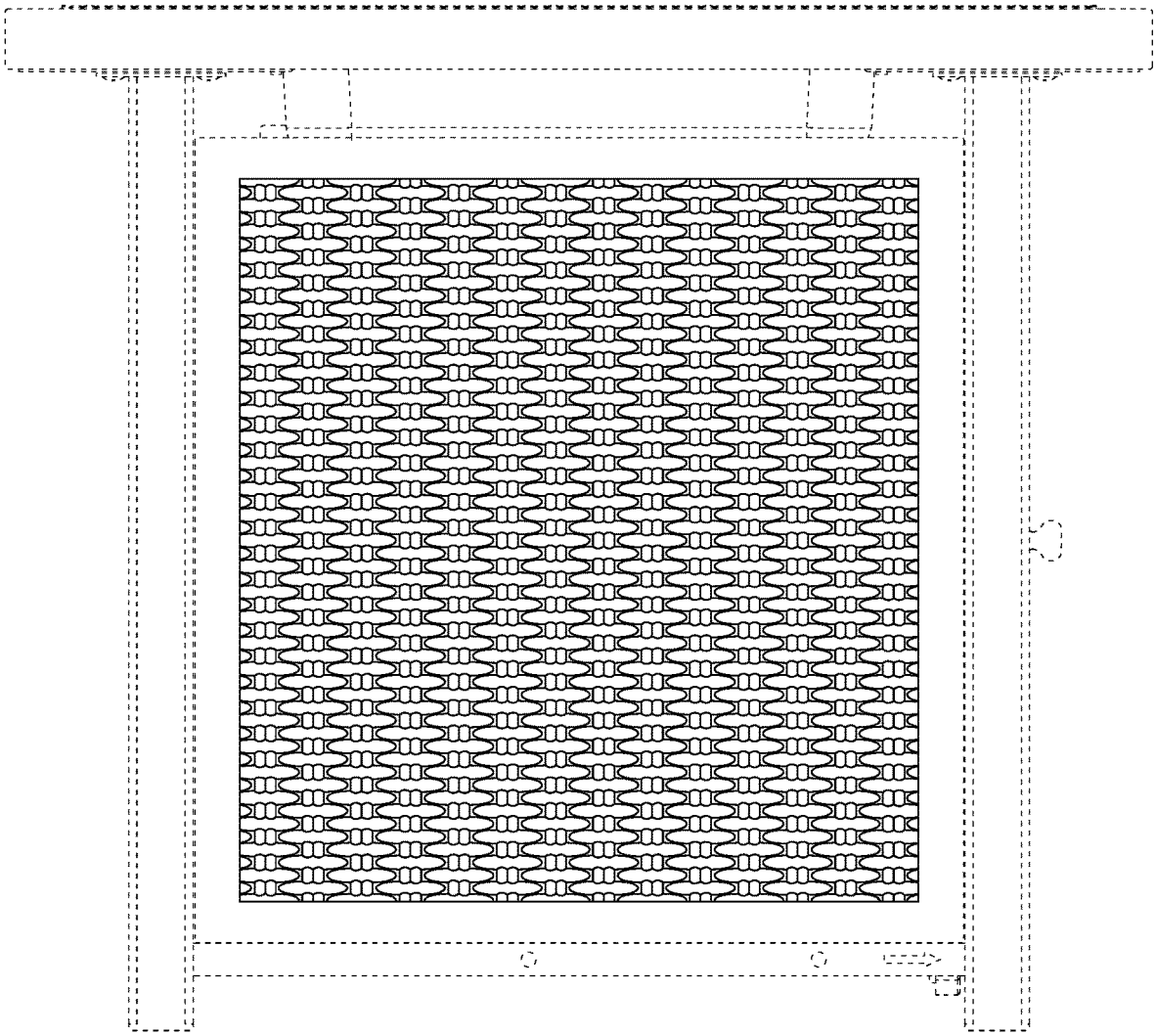
FIG. 4 (Amended)

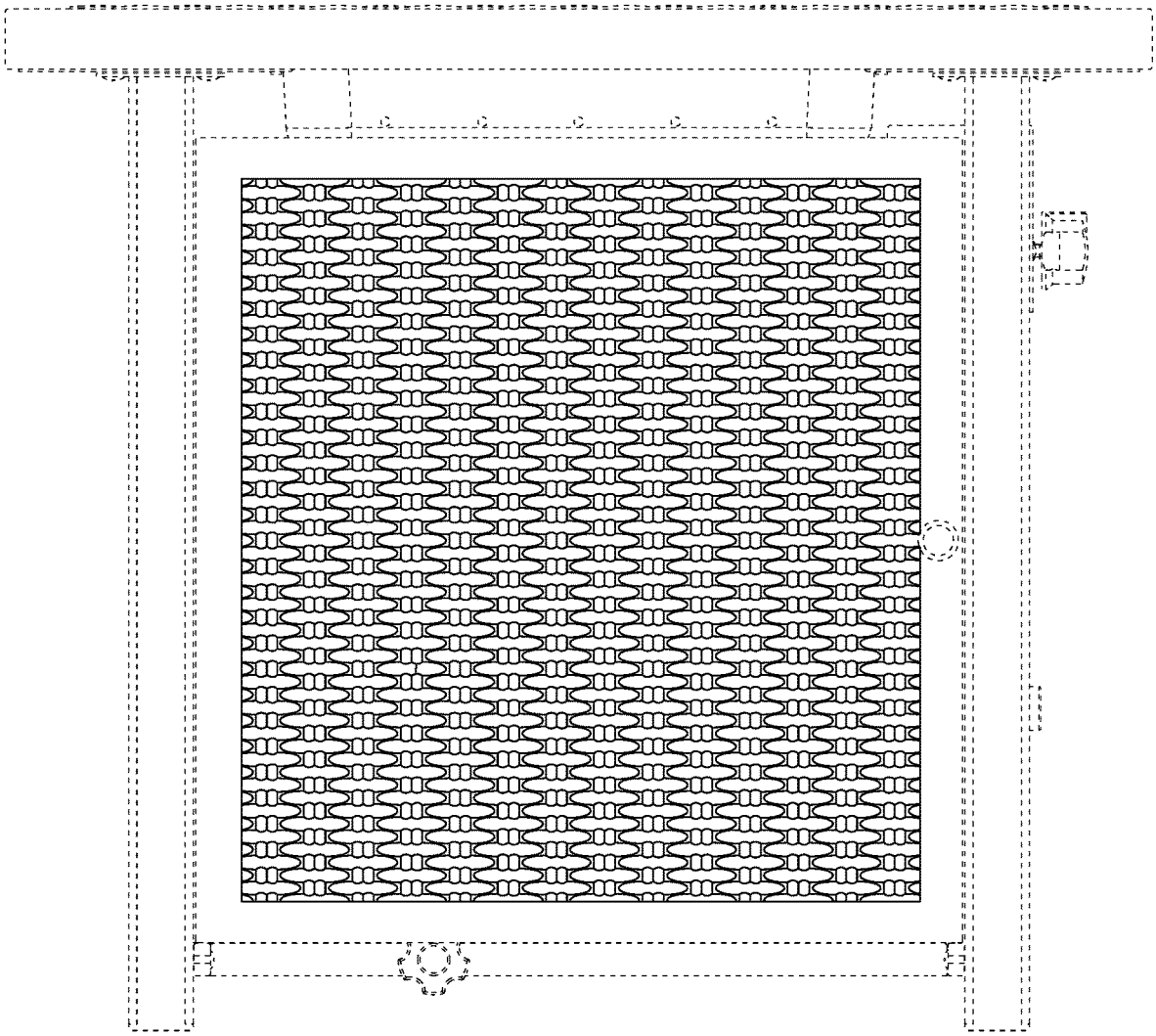
FIG. 5 (Amended)

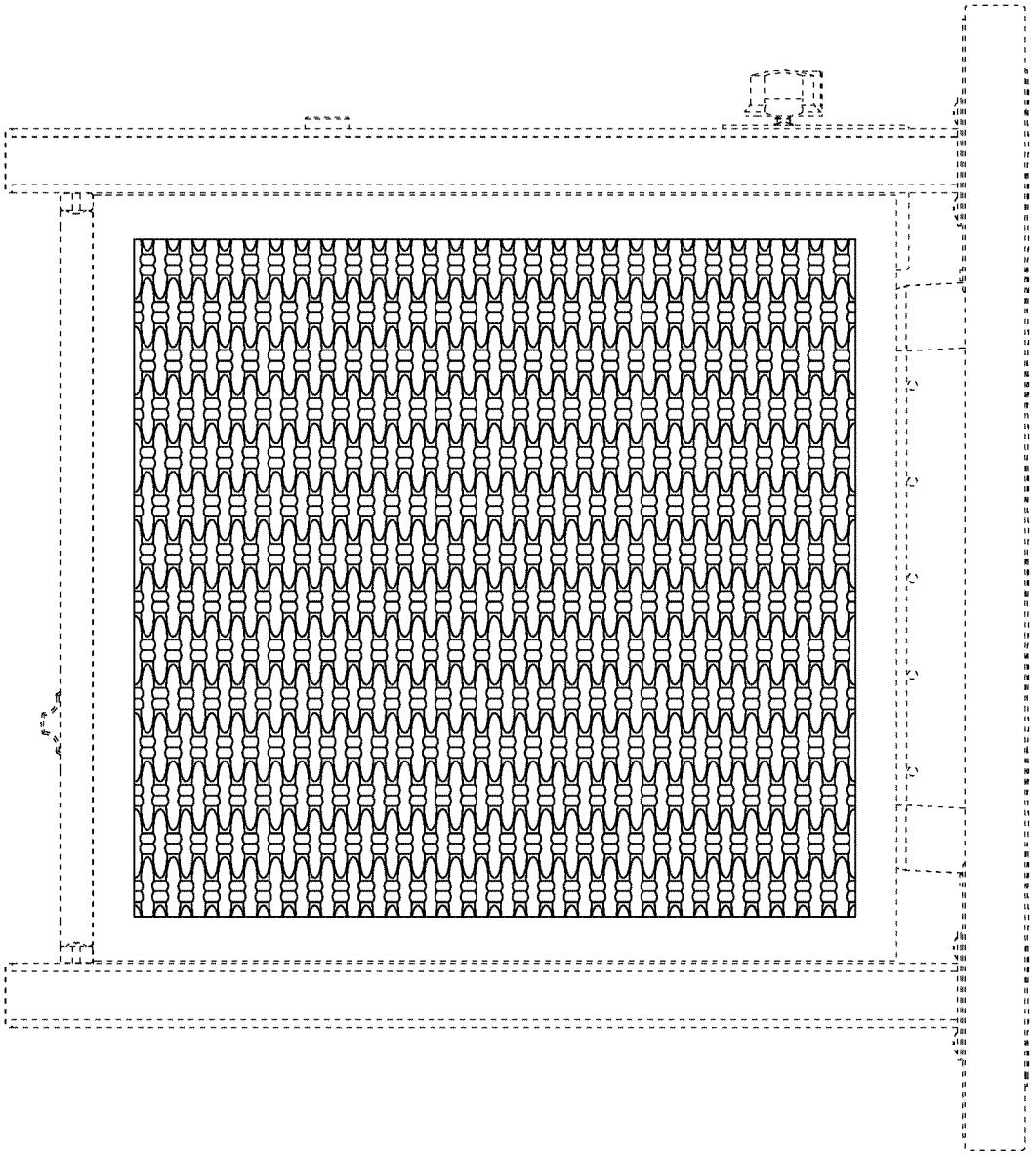
FIG. 6 (Amended)

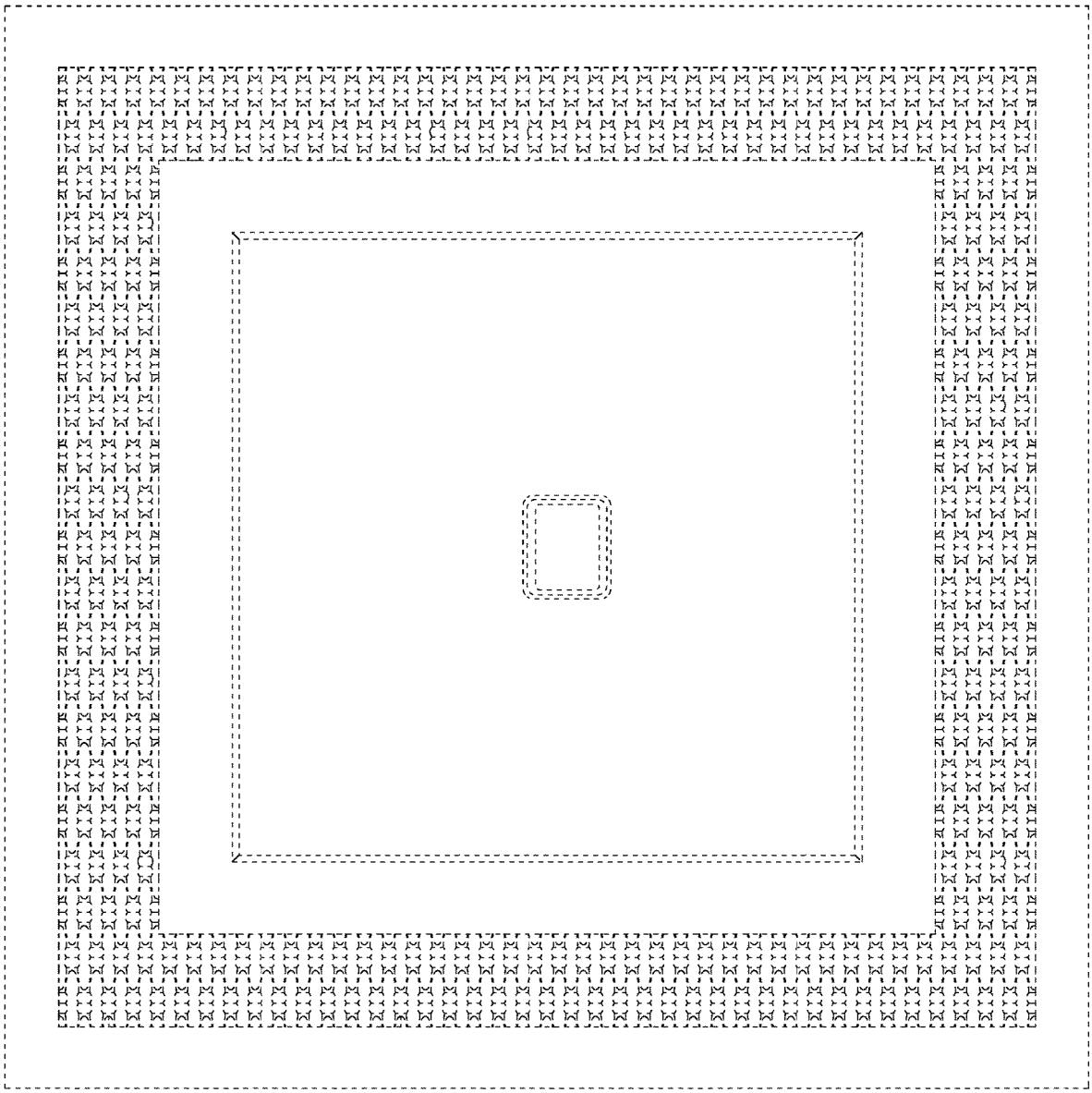
FIG. 7 (Amended)

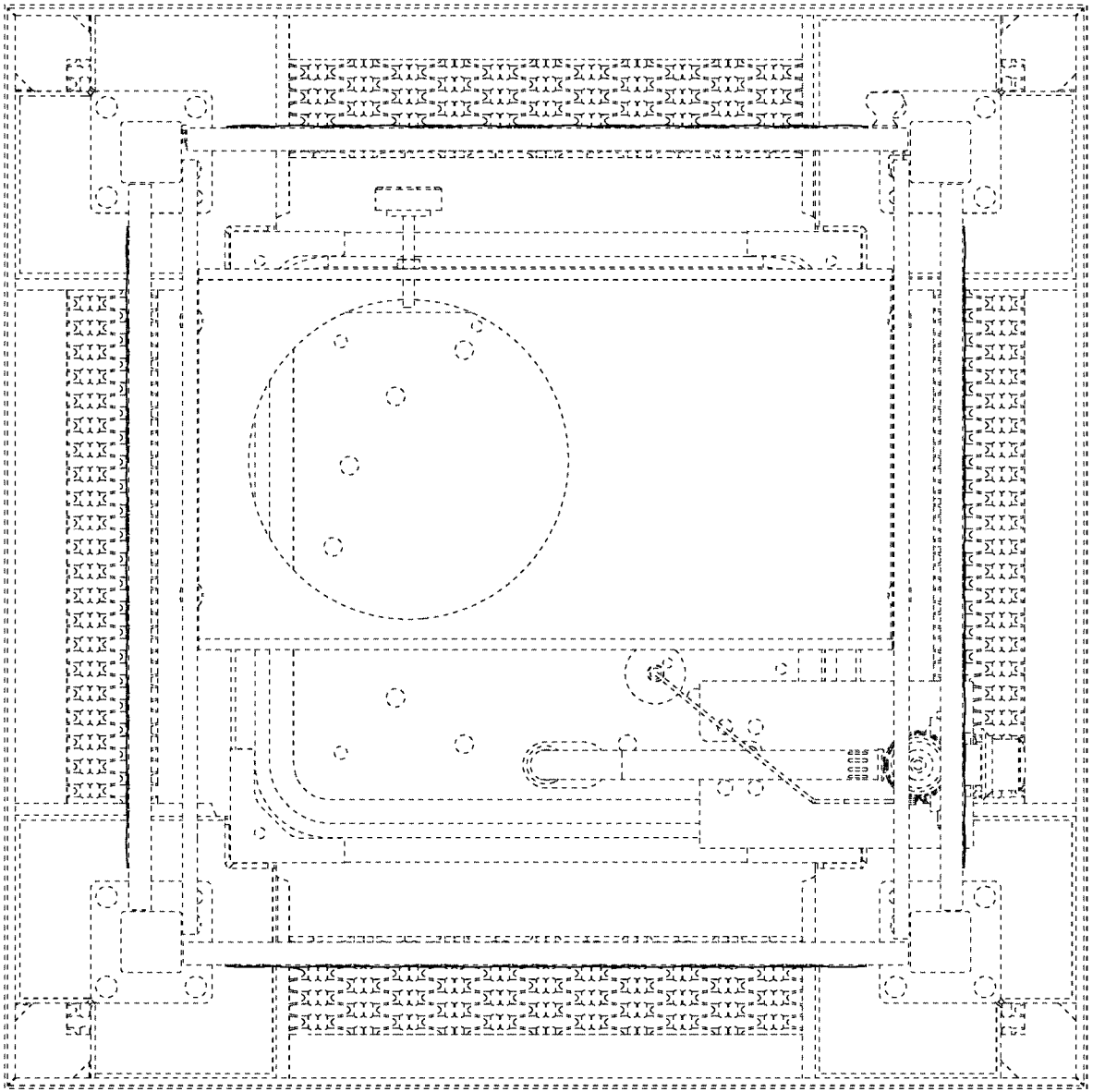
FIG. 8 (Amended)

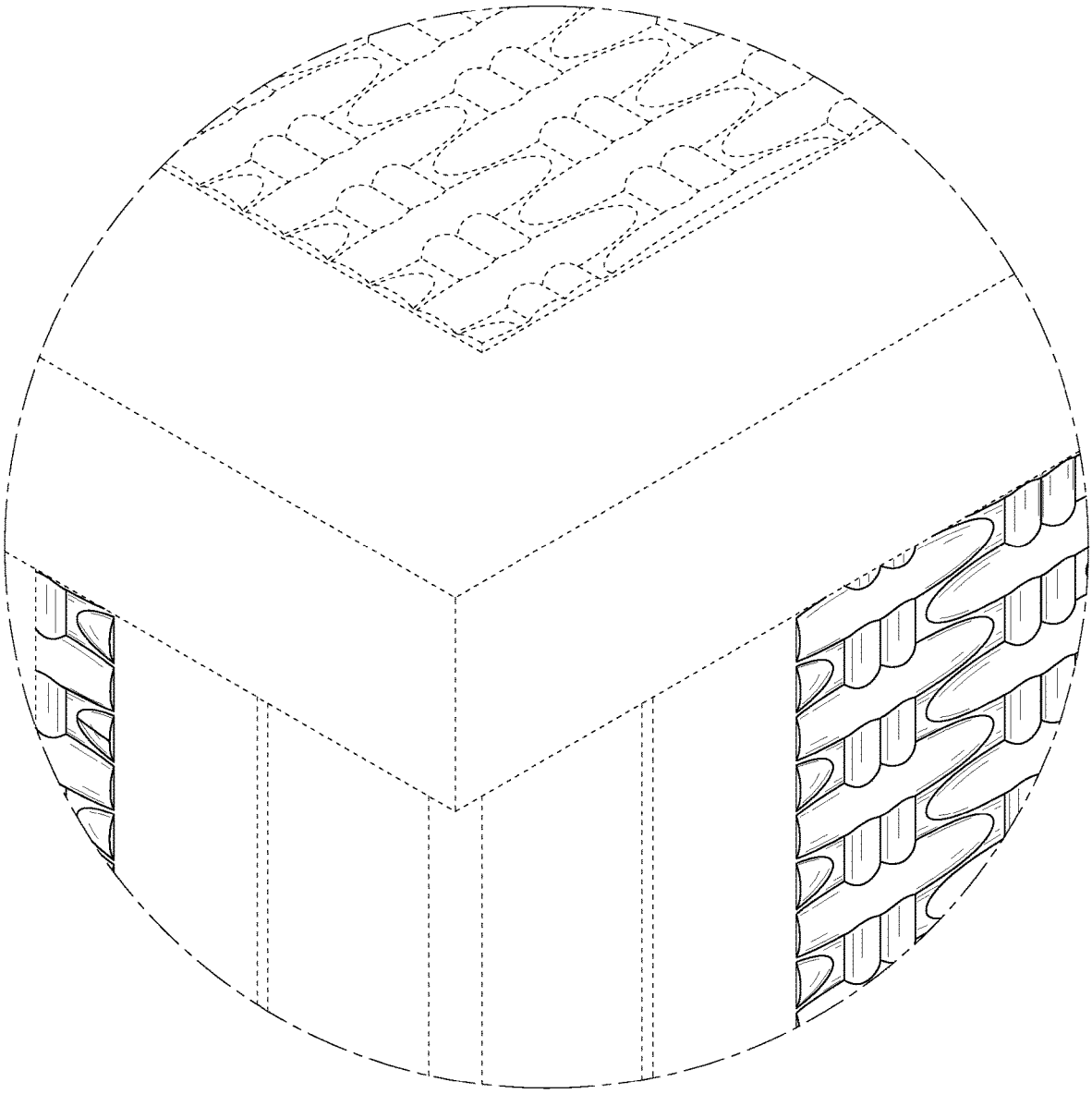
FIG. 9 (Amended)